Dec. 9, 1930.  A. G. DECKER  1,784,133
ELECTRIC DRIVE FOR GRINDER WHEELS
Filed Dec. 14, 1927
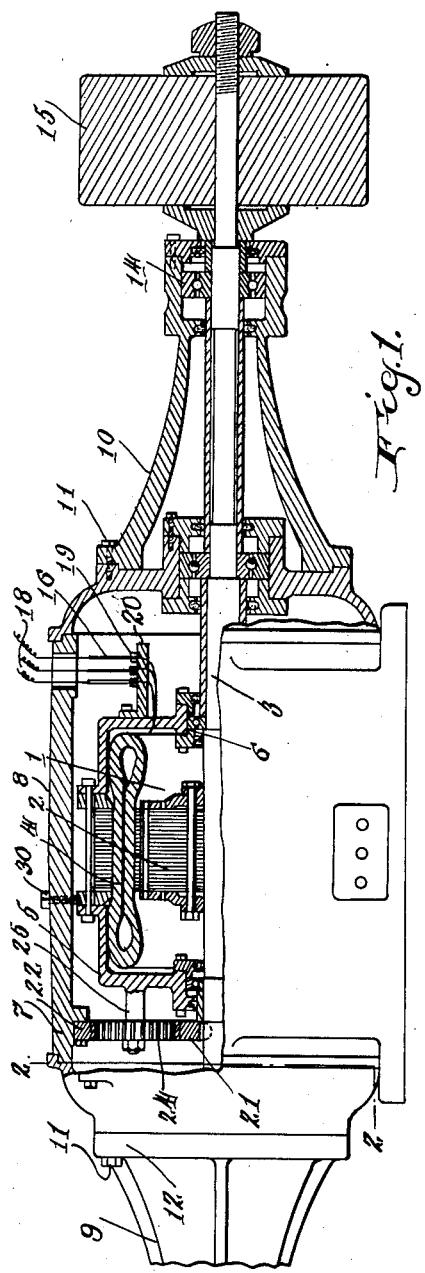
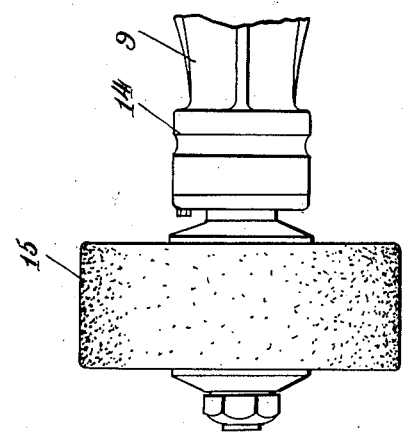
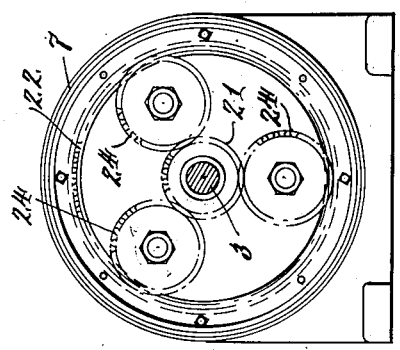
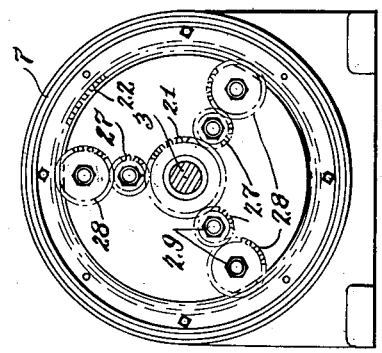
Inventor
Alonzo G. Decker
By Edwin Hammels
Attorney Patented Dec. 9, 1930

1,784,133

UNITED STATES PATENT OFFICE

ALONZO G. DECKER, OF BALTIMORE COUNTY, MARYLAND, ASSIGNOR TO MARSCHKE MANUFACTURING COMPANY, OF INDIANAPOLIS, INDIANA, A CORPORATION OF INDIANA

ELECTRIC DRIVE FOR GRINDER WHEELS

Application filed December 14, 1927. Serial No. 240,068.

The invention relates to grinding and buffing machines of the type in which the grinding wheel is mounted directly on the rotor or armature shaft. On account of the comparative ease with which it is generated, handled and distributed, the bulk of the electrical power supplied for all purposes is in the form of alternating current and while direct current is obtainable in various instances and alternating current may be rectified for use in direct current apparatus, this requires the use of extra apparatus and involves extra expense so that in all shops where alternating current is used, and these are in the large majority, the apparatus is driven by alternating current motors wherever the work in hand permits. The alternating current motor, however, particularly those of the induction type which is the simple and most widely used form of alternating current motor, is limited in its application on account of the lack of any practically available means for varying the speed from the so-called synchronous or standard speeds. Such motors are ordinarily adapted to operate at two so-called synchronous or standard speeds, only.

While it is, of course, generally understood that the motor speed may be varied by the introduction of resistance, this method is not regarded as practical or efficient on account of the expense due to the extra consumption of current and also on account of the loss of power of the motor when controlled in this way.

As already pointed out, the present invention relates to an electrically driven grinding and buffing machine. This machine has various uses in different shops, for example it is extensively used in buffing aluminum. In this work, with the standard size buffing wheels a speed of 2200 to 2600 revolutions per minute is required to secure the best results. Using for example the sixty cycle induction motor, sixty cycle current being quite generally supplied, synchronous speeds of 1800 and 3600 revolutions only are obtainable, so that this type of grinder could not be used to advantage for this purpose.

To overcome the difficulty without sacrificing the simplicity of the machine, particularly the direct drive in which the grinder wheel is mounted directly on the motor shaft, the applicant has devised an improved construction in which the field is mounted to rotate and is rotated, the rotary motion of the field being combined with the rotation of the armature relatively to the field producing a resultant rotation of the motor shaft which by imparting to the field the proper speed of rotation may be adapted to any purpose in hand, any desired rotary speed being obtainable.

In the preferred form of the invention illustrated, the field is mounted in a frame or casing which is, in turn, rotatively mounted on the motor shaft or rotor shaft and the casing with the field is rotated by means of planetary gearing. This gearing, in the form shown, includes a central or shaft gear mounted on the motor shaft to rotate therewith, an annular ring gear having its teeth inwardly disposed, also referred to as an internal gear or annulus, which may be secured to the inside of the motor housing or otherwise supported and intermediate gears driven from the central gear and engaging the ring gear, said gears being mounted on suitable spindles or bearings carried by the field casing or frame.

In the preferred form of the invention illustrated, each of the intermediate gears meshes with both the central gear and the ring gear, so that the field is driven in a direction opposite to the rotation of the rotor, the resultant rotation of the shaft being a reduced speed which can easily be so determined as to give the desired surface speed of the grinder wheel.

The machine is preferably constructed to provide for such change of gear ratios as may be desired.

In the accompanying drawings I have illustrated a motor driven grinding machine embodying the features of my invention in the preferred form.

In the drawings:

Figure 1 is an elevation of the machine, portions of the machine being broken away to show the internal construction, the parts thus exposed being shown on a plane of the axis. The grinder wheel and bearing at the left end of the machine are also removed.

Figure 2 is a section on the line 2—2 of Figure 1 looking to the left and showing the arrangement of gearing by which the field is driven in the same direction of rotation of the rotor, reducing the resultant speed below the standard speeds of the motor.

Figure 3 is a similar section showing a modified form in which the gearing is so arranged as to rotate the field in the opposite direction to the normal direction of rotation of the rotor, increasing the resultant speed of the motor shaft and grinding wheel above the synchronous speeds of the motor.

Figure 4 is a view of the grinder wheel and bearing housing and a portion of the casing at the left, which are removed from Figure 1.

Referring to the drawings by numerals, each of which is used to indicate the same or similar parts in the different figures, the machine, as shown, comprises an alternating current motor of the induction type 1 having a rotor 2 mounted on motor shaft or rotor shaft 3 and secured thereto to drive the shaft. The motor field 4 is shown as mounted in a casing or frame 5, which casing or frame is provided with bearings 6 concentric with the motor axis, by means of which bearings the casing is rotatively mounted on the motor shaft 3.

The motor and the shaft 3 together with the gearing, to be described, are enclosed in a machine casing or housing 7 which, in the form of the invention shown, consists of a central section 8 and end sections 9 and 10 secured to the central section by means of bolts 11 engaging flanges 12. The end sections 9 and 10 are provided, in the form of the machine shown, with bearings 14 for the shaft 3 and there is a grinding or buffing wheel 15 secured to the shaft 3 at each end.

The current may be led to the field by means of brushes 16 supplied with current by way of wires 18, the brushes 16 contacting the collector rings 19 mounted on a suitable support 20 concentric with the axis and secured to the field casing 5.

In the form of the invention shown, rotation of the field whereby the actual or absolute speed of the shaft is controlled, is accomplished by means of planetary gearing comprising a central or drive gear 21 mounted on the motor shaft or main shaft 3, an annulus or internally toothed ring gear 22 which may be mounted on the inside of the machine casing 9, and intermediate gears 24 mounted on studs 25 projecting from the field casing or frame 5.

In the form of the invention shown, the intermediate gears 24 mesh with both the drive gear 21 on the shaft and the stationary annulus 22 on the housing 8. This causes the field to rotate oppositely to the rotation of the armature relatively to the field producing a resultant speed of rotation of the shaft which is less than the corresponding motor speed by a predetermined amount, giving by selection of the proper gear ratio any desired surface speed of the wheel.

Figure 3 shows a modified construction by means of which the field may be rotated in the same direction as the motor shaft and rotor producing an increased resultant speed of rotation of the shaft. In this construction the center or driving gearing 21 on the shaft is connected to the annulus 22 by means of one or more pairs of pinions 27 and 28, the pinions 27 meshing with the central or shaft gear 21 and the outer pinions 28 each meshing with its respective pinion 27 and with the annulus 22. The pinions 27 and 28 are mounted on suitable studs 29 projecting from the casing 5.

In the operation of the machine, the grinding or buffing wheels 15 being mounted on the shaft 3, these grinding or buffing wheels may be driven at the synchronous speeds of rotation of the motor, the field 4 and field casing or frame 5 being locked in position for this purpose in any suitable manner as by means of locking pin 30. When the field is locked the gears are thrown out of mesh or removed. One additional speed may be obtained for each standard speed of the motor by use of the planetary gearing shown in Figure 2, it being understood that with this train of planetary gearing the field casing will be rotated in a direction opposite to the rotative tendency of the motor, reducing the synchronous speed so that, assuming that the motor has two standard speeds, each of these speeds being thus reduced, two additional speeds are obtained.

In accordance with the invention, the gears are so selected as to size and number of teeth that at least one of these additional speeds is suited to a particular operation which it is desired to perform with the grinding or buffing wheels, giving the desired surface speed of these wheels.

By means of the train of gearing shown in Figure 3, one or both of the synchronous speeds may be increased, other useful surface speeds of the grinding and buffing wheels being obtained in this way. It is also apparent that without changing the spindles 25 and 29 other additional speeds may be obtained by removing the gears 21 and 24 and installing other gears having a different ratio but the same total diameter. As already pointed out, a grinder driven by an alternating current induction motor or other alternating current motor can be thus adapted to the production of any desired surface speed necessary to the grinding or buffing arts without the use of resistance or other change of the electric circuit.

The production in this way of any desired surface speeds of the standard sized grinder wheels without sacrificing the direct drive of the wheel or the normal efficiency of the alternating current motor, is regarded as of importance.

I have thus described specifically and in detail a motor driven grinder embodying the features of my invention in the preferred and in a secondary form in order that the nature and manner of operating the same may be clearly understood, however, the specific terms herein are used descriptively rather than in a limiting sense, the scope of the invention being defined in the claims.

What I claim as new and desire to secure by Letters Patent is:

1. An electric drive for a grinding or buffing machine comprising a main shaft, an alternating current induction motor having a rotor secured to the shaft, a field member mounted to rotate about the axis of the shaft, planetary gearing for rotating the field member comprising a gear secured to the shaft, an internal ring gear non-rotatively mounted and an intermediate gear mounted on the field member and meshing with both the shaft gear and the ring gear.

2. An electric drive for a grinding or buffing machine comprising a main shaft, an alternating current induction motor having an armature secured to the shaft, a field member mounted to rotate about the shaft, and planetary gearing for rotating the field member comprising a toothed gear mounted on the shaft, a stationary annulus and intermediate gearing driven by the shaft gear and engaging said annulus, mounted on the field.

3. In a grinding or buffing machine, a main shaft, to which a grinding or buffing wheel may be secured, an alternating current induction motor having an armature secured to the shaft, a field member mounted to rotate about the shaft, and planetary gearing for rotating the field member comprising a toothed gear mounted on the shaft, a stationary annulus, intermediate gearing driven by the shaft gear and meshing with the annulus and mounted on the field member to rotate the same and means for securing the field member against rotation at the will of the operator the planetary gearing being adapted to be disconnected for this purpose.

4. An electric drive for a grinding or buffing machine comprising an alternating current induction motor having a main shaft, an armature secured to the shaft, a stationary housing, an annulus secured to the housing, a toothed gear secured to the shaft, intermediate gearing driven by the shaft and meshing with the annulus and a rotary field member, the intermediate gearing being mounted on the field member which is rotated thereby.

5. An electric drive for a grinding or buffing machine comprising an alternating current induction motor having a main shaft, an armature secured to the shaft, a stationary housing, an annulus secured to the housing, a toothed gear secured to the shaft, intermediate gearing driven by the shaft and meshing with the annulus and a rotary field member, the intermediate gearing being mounted on the field member which is rotated thereby, a latch for locking the field member against rotation, the gearing being adapted to be disconnected for this purpose.

Signed by me at Towson, Maryland, this 10th day of November, 1927.

ALONZO G. DECKER.